No. 620,350. Patented Feb. 28, 1899.
J. F. McGRAIL.
BULLET GREASING MACHINE.
(Application filed Jan. 4, 1899.)
(No Model.) 5 Sheets—Sheet 1.

Fig. 1ᵃ.

Witnesses. John F. McGrail,
Inventor.
By attys Earle Seymour

No. 620,350. Patented Feb. 28, 1899.
J. F. McGRAIL.
BULLET GREASING MACHINE.
(Application filed Jan. 4, 1899.)
(No Model.)
5 Sheets—Sheet 3.
Fig. 3
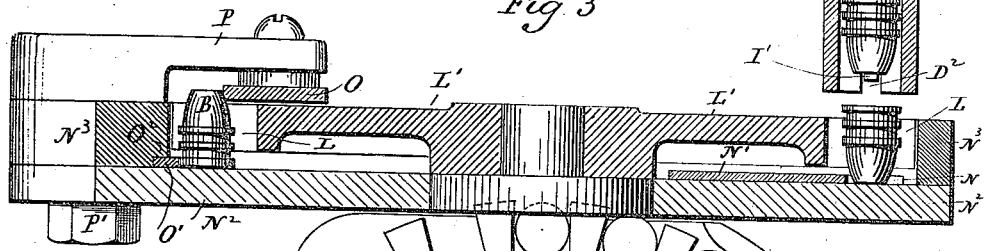
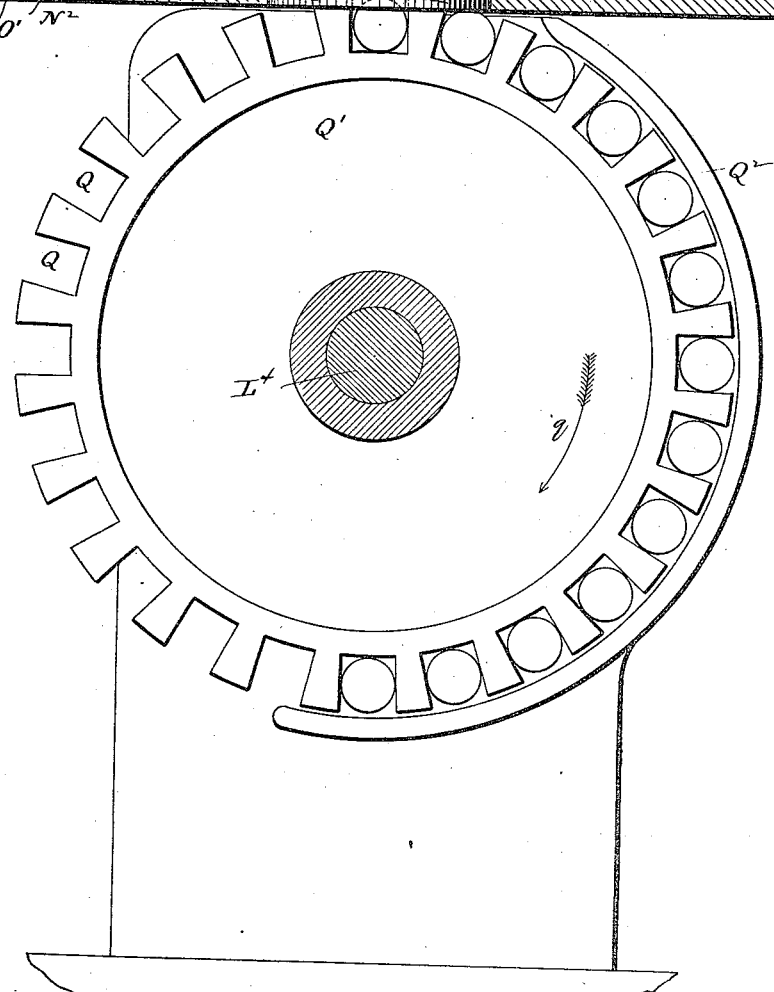
Witnesses.
John F. McGrail
Inventor.
By atty Earle Seymour No. 620,350. Patented Feb. 28, 1899.
J. F. McGRAIL.
BULLET GREASING MACHINE.
(Application filed Jan. 4, 1899.)
(No Model.) 5 Sheets—Sheet 4.

No. 620,350. Patented Feb. 28, 1899.
J. F. McGRAIL.
BULLET GREASING MACHINE.
(Application filed Jan. 4, 1899.)
(No Model.) 5 Sheets—Sheet 5.

John F. McGrail, Inventor.
By atty Earl Seymour

UNITED STATES PATENT OFFICE.

JOHN F. McGRAIL, OF NEW HAVEN, CONNECTICUT, ASSIGNOR TO THE WINCHESTER REPEATING ARMS COMPANY, OF SAME PLACE.

BULLET-GREASING MACHINE.

SPECIFICATION forming part of Letters Patent No. 620,350, dated February 28, 1899.

Application filed January 4, 1899. Serial No. 701,127. (No model.)

*To all whom it may concern:*

Be it known that I, JOHN F. MCGRAIL, of New Haven, in the county of New Haven and State of Connecticut, have invented a new Improvement in Bullet-Greasing Machines; and I do hereby declare the following, when taken in connection with the accompanying drawings and the letters of reference marked thereon, to be a full, clear, and exact description of the same, and which said drawings constitute part of this specification, and represent, in—

Figure 1:
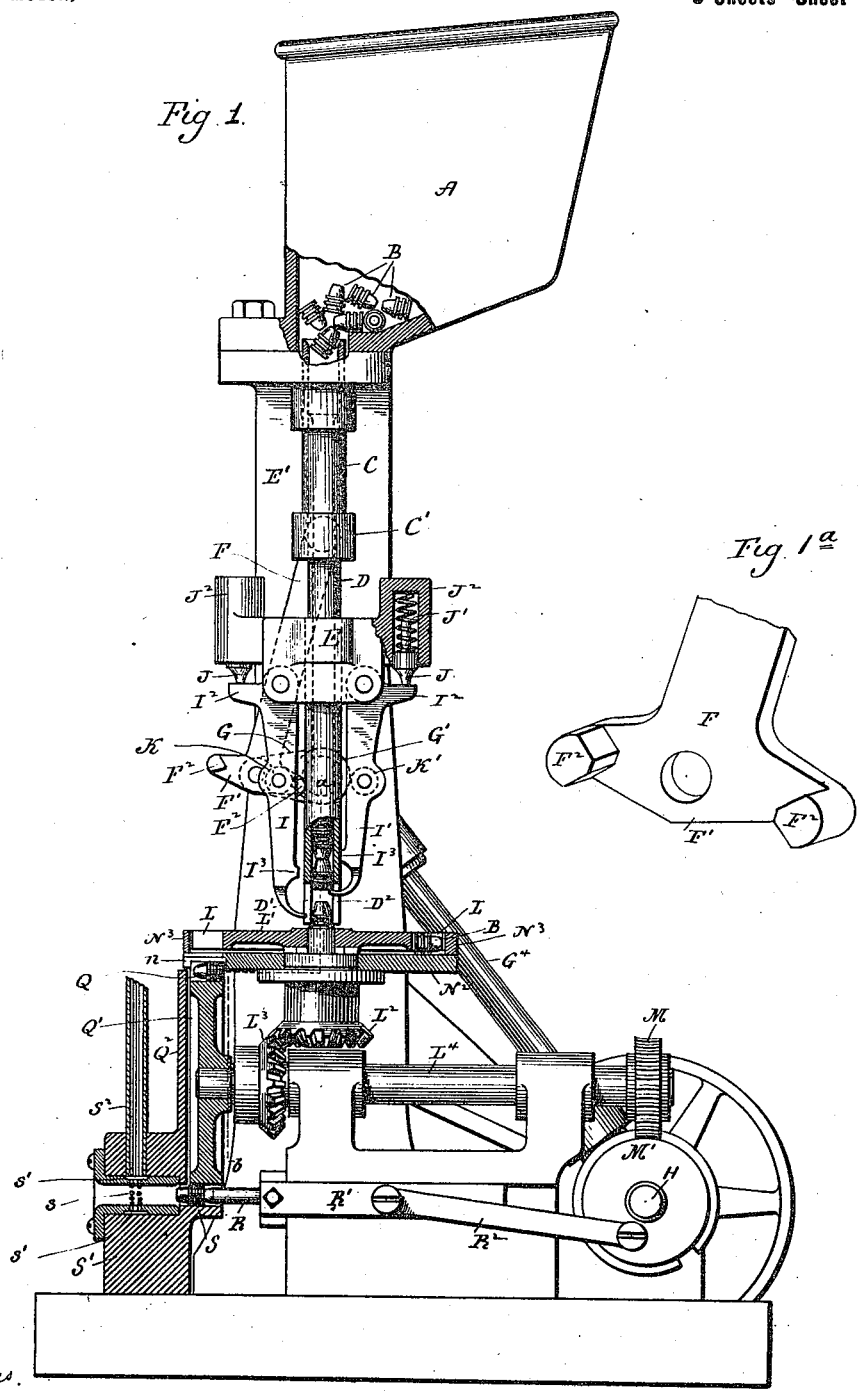
Figure 2:
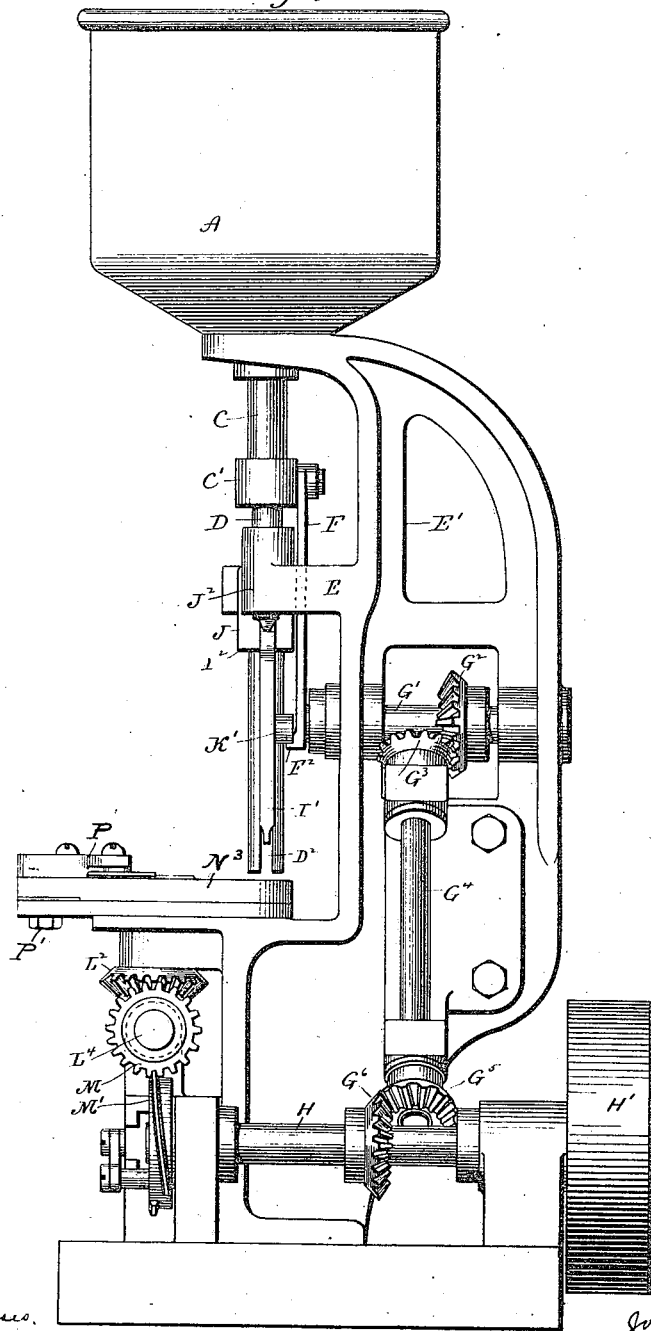
Figure 4:
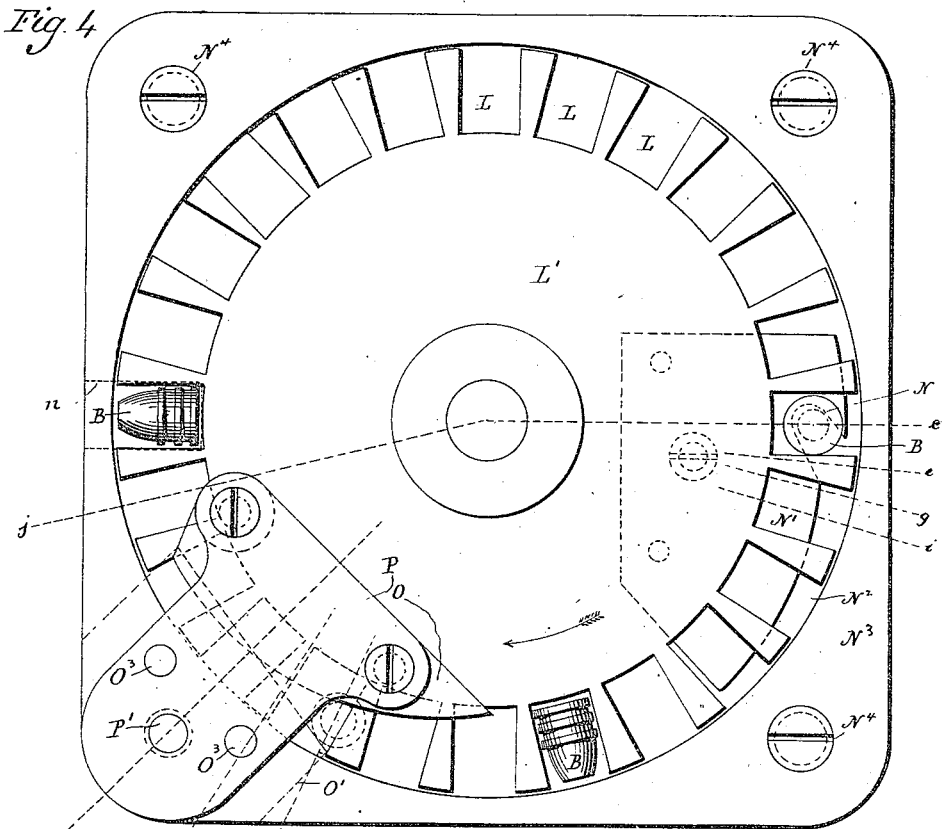
Figure 6:
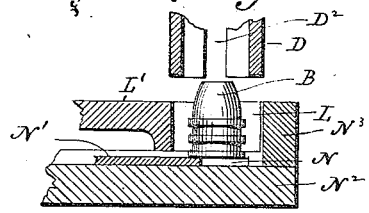
Figure 5:
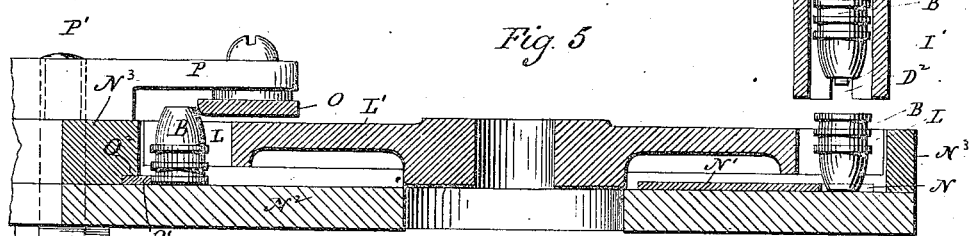
Figure 7:
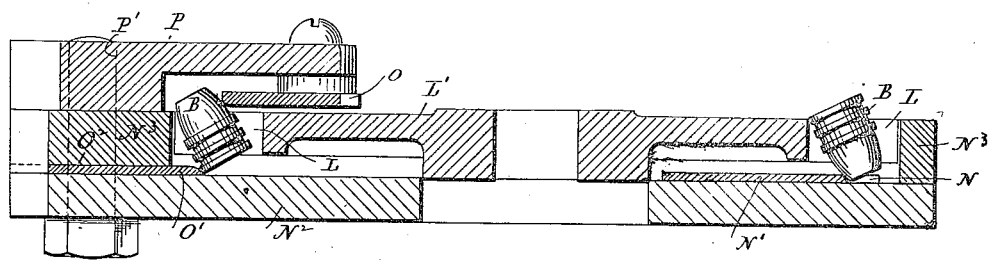
Figure 8:
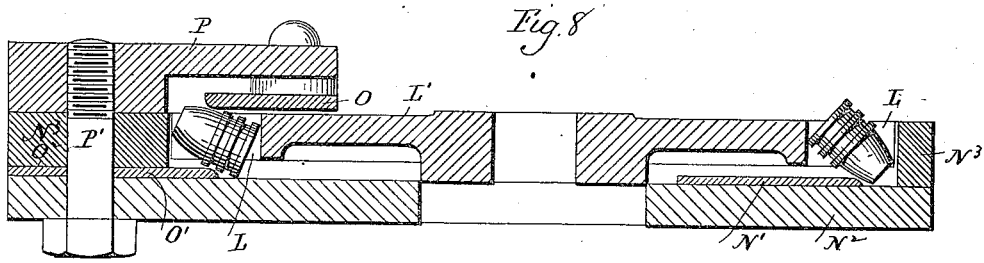
Figure 9:
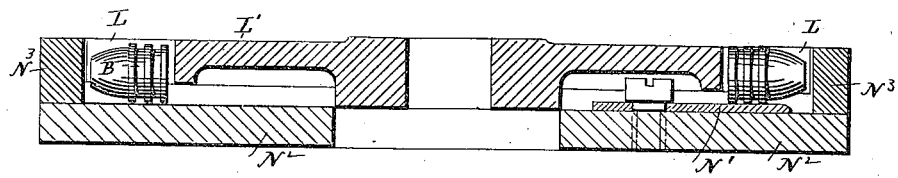
Figure 10:
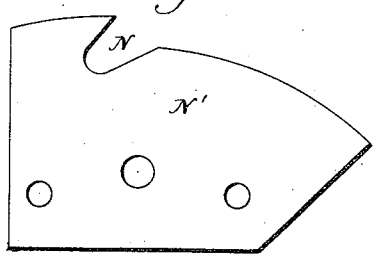
Figure 11:
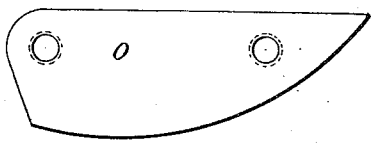
Figure 12:
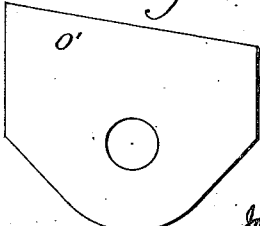

Figure 1, a view, partly in front elevation and partly in vertical section, of one form which a greasing-machine constructed in accordance with my invention may assume; Fig. 1$^a$, a perspective view of the lower end of the operating-link; Fig. 2, a view of the machine in side elevation; Fig. 3, a sectional view of the machine on the line $a\ b$ of Fig. 1, on a larger scale than the same; Fig. 4, a plan view of the dial, the guard-plate by which the same is surrounded, and the cams employed for arranging the bullets uniformly in the dial irrespective of their end presentation thereto; Fig. 5, a view in vertical section on the line $c\ d$ of Fig. 4; Fig. 6, a less comprehensive sectional view on the same line, showing how a bullet which is presented with its butt-end downward rests upon the upper face of the plate-cam N' instead of entering the slot N of the said cam; Fig. 7, a sectional view on the line $e\ f$ of Fig. 4; Fig. 8, a view on the line $g\ h$ thereof; Fig. 9, a view on the line $i\ j$ thereof;
Fig. 10, a detached plan view of the bullet-arranging cam N'; Fig. 11, a detached plan view of the bullet-reversing cam O; Fig. 12, a corresponding view of the bullet-reversing cam O'.

My invention relates to an improved bullet-greasing machine in which the bullets are thrown *en masse* into a hopper and thereafter handled entirely by the machine until they emerge therefrom completely greased, the object of my invention being to produce a simple and effective machine of the character described, with particular reference to means for securing the right presentation of the bullets to the feed-wheel, from which they are successively forced into the greasing-die.

With these ends in view my invention consists in certain details of construction and combinations of parts, as will be hereinafter described, and pointed out in the claims.

In carrying out my invention as herein shown I employ a hopper A, into which the bullets B are thrown *en masse* and from which they gravitate into the upper end of a tubular agitator C, which is adapted to be vertically reciprocated upon the upper end of a feed-tube D, which is supported by a forwardly-projecting arm E of the frame E' of the machine. The tubular agitator C is formed at its lower end with a shoulder C', which provides for the pivotal attachment of the agitator to the upper end of an operating-link F, formed at its lower end with a transversely-arranged head F', furnished with two beveled forwardly-projecting operating-fingers F$^2$ F$^2$, located opposite each other in a plane at a right angle to the axis of the link. The lower end of the said link is connected with a crank G, which is secured to a shaft G', mounted in the frame of the machine. The said shaft is furnished with a bevel-gear G$^2$, which meshes into a corresponding gear G$^3$, mounted upon the upper end of a shaft G$^4$, the lower end of which is furnished with a bevel-gear G$^5$, which meshes into a bevel-gear G$^6$, mounted upon the main driving-shaft H, which is driven by a belt running over a pulley H'. The operating-link F not only reciprocates the tubular agitator C, but through its forwardly-projecting beveled arms F$^2$ F$^2$ alternately operates the two cut-off levers I I', of which the former is longer than the latter. These levers are pivotally suspended from the horizontal arm E of the frame E' and extend downward on opposite sides of the lower end of the feed-tube D, the extreme lower end of which is formed with oppositely-located openings or slots D' D$^2$ for the reception of the hooked lower ends of the levers, which enter the slots at different elevations, as clearly shown in Fig. 1. The hooked lower ends of the said cut-off levers I and I' are constantly urged inward into the said slots D' and D$^2$ of the feed-tube by means of plungers J, encircled by springs J' and located in the downwardly-opening chambers J$^2$, formed upon the end of the arm E of the frame E', the said plungers being engaged with heels I$^2$, extending outwardly from the upper ends of the said levers. For the purpose of alternately forcing the lower ends of the levers outward out of the feed-tube to permit the bullets to gravitate down through it I provide the lever I with a rearwardly-projecting antifriction-roll K and the lever I' with a corresponding antifriction-roll K', these rolls coacting with the forwardly-projecting arms $F^2$ $F^2$, located at the lower end of the operating-link F. It will of course be understood that with the rotation of the crank G the lower end of the link F will be moved in a circular path of which the shaft G' is a center. As the lower end of the link is thus moved through this path its arms $F^2$ $F^2$ will be alternately engaged with the antifriction-rolls K and K' upon the inner faces thereof, whereby the cut-off levers will be forced outward in rapid alternation. The inward movement of these levers is limited by the engagement of the stop-lugs $I^3$, formed upon the inner edges of their lower ends, with the lower end of the feed-tube at a point just above the slots D' $D^2$ therein. It will be understood that when the cut-off lever I is forced outward, as shown in Fig. 1 of the drawings, the column of bullets will be held by the lever I', as shown in the same figure, and vice versa. From the feed-tube the bullets drop into the radially-arranged pockets L, formed in the periphery of a horizontally-arranged dial L', which is rotated by means of a bevel-gear $L^2$, meshing into a corresponding bevel-gear $L^3$, mounted upon the shaft $L^4$, which is provided at its rear end with a worm-gear M, meshed into by a worm-like cam M', mounted upon the main driving-shaft H, before mentioned. In their descent into the pockets of the dial from the feed-tube the bullets come down point first or butt first, according to the accident of the mode of their entrance into the upper end of the tubular agitator from the hopper. If a bullet is presented to the dial point downward, as shown in Fig. 5, its point enters a tangentially-arranged slot N, formed in the outer edge of a horizontal bullet-arranging plate-cam N', which is secured to a horizontal table $N^2$, fastened to the machine-frame. The inner wall of the slot N is beveled or shaped so as to constitute a cam, which operates as the dial revolves to push the point of the bullet outward, as shown in Figs. 7 and 8, until it loses its equilibrium and falls into a horizontal position, as shown in Fig. 9. Figs. 5, 7, and 8, which show the start of the bullet in its vertical position with its point downward and leave it in a horizontal position with its point outward, are sections on Fig. 4 of the drawings, as will appear upon examination. It will thus be seen that if the bullets emerge point downward from the feed-tube they are very quickly brought into right position in the dial by means of the plate-cam N'. If, on the other hand, owing to the accident of their entrance into the upper end of the tubular agitator from the hopper, the bullets emerge from the lower end of the feed-tube butt downward, they do not enter the slot N of the plate-cam N', but come to a bearing upon the upper surface of the outer edge of the cam, over which they ride without disturbance by the cam in question, Fig. 6 of the drawings showing clearly the butt presentation of a bullet to this cam. To bring a bullet thus presented into right position in the dial, two horizontal bullet-arranging plate-cams are employed, as herein shown—namely, an upper plate-cam O and a lower plate-cam O'. The said plate-cam O is secured by its ends to a bracket P, extending over the edge of the dial L' and at its outer end resting upon the guard-plate $N^3$, which is secured by screws $N^4$ to the upper face of the table $N^2$, as clearly shown in Fig. 4, the bracket P being secured in place by a bolt P', extending upward through the table, the guard-plate, and the bracket. The plate-cam O' is located below the plane of the dial L', rests directly upon the table $N^2$, enters a recess $O^2$, formed to receive it in the lower face of the guard-plate $N^3$, and is secured in place by the bolt P', in conjunction with two dowels $O^3$ $O^3$, which are located in the guard-plate. Now, supposing a bullet to have come down butt-end first, it drops upon the plate-cam N', as before mentioned, and in the rotation of the dial rides over the same and is undisturbed until its point, which is uppermost, engages with the plate-cam O, the cammed outer edge of which begins to tip the bullet outward, as shown in Fig. 7. Soon after this tipping action of the plate-cam O begins the butt of the bullet engages with the plate-cam O', which begins to push the butt of the bullet inward, as shown in Fig. 8. The bullet then loses its equilibrium and falls into the position shown in Fig. 9. It will thus be seen that by means of the plate-cams N', O, and O' the bullets are properly arranged in the dial irrespective of the mode of their presentation thereto in issuing from the feed-tube.

The table $N^2$ is formed with an opening $n$, through which the bullets drop, as they are brought into registration with it by the rotation of the dial L', into suitable pockets Q, formed in the periphery of a vertically-arranged feed-wheel Q', which is mounted upon the extreme forward end of the shaft $L^4$, before mentioned. This feed-wheel is intermittently rotated in the direction of the arrow $q$, Fig. 3, and the bullets are prevented from dropping out of its pockets by means of a guard $Q^2$. This feed-wheel presents the bullets, after having carried them through a circle of one hundred and eighty degrees, into registration with an intermittently-operated punch R, mounted in a slide R', connected by a link $R^2$ with the worm-cam M', before mentioned. The said punch operates to shove the bullets out of the pockets of the feed-wheel into a tubular greasing-die S, horizontally mounted in a block S', secured to the machine-frame. The motion of the punch is regulated so that it will push the bullets into the die, so that their grooves will be brought into registration with the radial apertures s, which lead into it from the annular groove s', encircling it, grease being fed under pressure to this groove from a grease-supply pipe S². It will be understood, of course, that the bullets push each other forward out of the die.

I may now explain that the various instrumentalities of the machine are timed in their intermittent action so that when the dial and feed-wheel are at rest a bullet is fed into the dial, while another bullet is passing from the dial into the feed-wheel, and while the punch is forcing another bullet from the feed-wheel into the greasing-die.

In carrying out my invention some changes from the construction herein shown and described may be made not only in the means employed for operating the main instrumentalities of the machine, but also in those instrumentalities themselves, and I may even see fit to employ the means shown and described for arranging bullets in uniform end presentation in some other machine than one designed for greasing the bullets. I would therefore have it understood that I do not limit myself to the exact construction shown and described, but hold myself at liberty to make such alterations as fairly fall within the spirit and scope of my invention.

Having fully described my invention, what I claim as new, and desire to secure by Letters Patent, is—

1. In a machine for greasing bullets, the combination with greasing devices, of a feed-wheel for presenting bullets thereto, a dial for presenting bullets to the feed-wheel, and means combined with the dial for arranging the bullets in uniform end presentation.

2. The combination with a dial having radially-arranged bullet-receiving pockets, of means for feeding bullets thereto either end being uppermost, of cams arranged with respect to the dial to coact therewith in rearranging the bullets after being fed thereto to secure their uniform end arrangement therein.

3. The combination with a dial having radially-arranged bullet-receiving pockets, of means for feeding bullets thereto either end being uppermost, of a cam for engaging with the points of the bullets which are fed point downward, and cams for engaging with the points and butts of bullets which are fed butt downward, whereby the bullets are tipped outward or inward in the dial according to the character of their presentation thereto, so as to secure their uniform end arrangement therein.

4. The combination with a feed-tube, of two cut-off levers coacting with the lower end thereof which they enter at different elevations, and means for intermittently operating the said levers, so that when one lever is retracted for releasing the lowermost bullet, the other lever will hold the column of bullets against descent in the tube, and vice versa.

5. The combination with a feed-tube, the lower end of which is slotted, of two cut-off levers the lower ends of which enter the said slots in the lower end of the feed-tube at different elevations, and means for intermittently operating the said levers, so that when one lever is retracted for releasing the lowermost bullet, the other lever will hold the column of bullets against descent in the tube, and vice versa.

6. The combination with a hopper, of a feed-tube leading therefrom, a tubular agitator encircling the upper end of the feed-tube and entering the hopper, two cut-off levers the lower ends of which are formed with hooks adapted to enter the feed-tube at the lower end thereof at different elevations therein to alternately hold the column of bullets in the tube while the lowermost bullet is being fed therefrom, an operating-link connected with the lower end of the tubular agitator, and a driving-crank connected with the lower end of the link which is adapted to alternately engage with the cut-off levers so as to alternately operate the same as well as to impart vertical reciprocation to the tubular agitator.

7. In a machine for greasing bullets, the combination with a feed-tube from which the bullets are fed one by one, of a dial to which the bullets are fed from the feed-tube, means combined with the dial for tipping the bullets outward or inward therein so as to secure uniform end presentation for them, a feed-wheel to which the bullets are fed from the dial-wheel, greasing devices, and a punch for transferring the bullets from the feed-wheel into the said greasing devices.

In testimony whereof I have signed this specification in the presence of two subscribing witnesses.

JOHN F. McGRAIL.

Witnesses:
DANIEL H. VEADER,
THOS. C. JOHNSON.